Patented Apr. 26, 1949

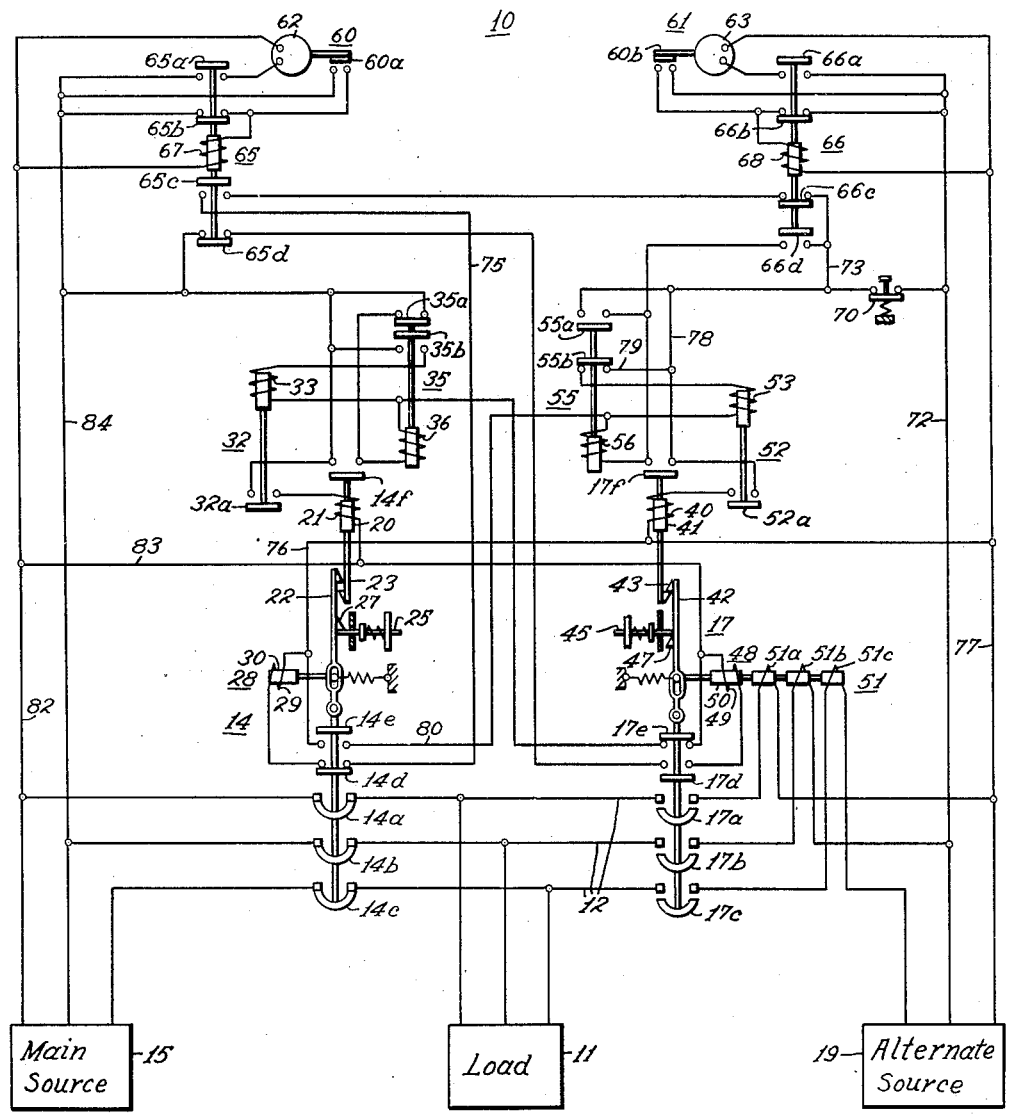

2,468,135

UNITED STATES PATENT OFFICE 2,468,135

TRANSFER CONTROL SYSTEM

William R. Taliaferro, Edgewood, Pa., assignor to Westinghouse Electric Corporation, East Pittsburgh, Pa., a corporation of Pennsylvania Application April 3, 1945, Serial No. 586,386

7 Claims. (Cl. 171—97)

My invention relates generally to control systems and has reference, in particular, to circuit breaker control systems.

Generally stated, it is an object of my invention to provide a circuit breaker control system that is simple and inexpensive to manufacture and is reliable in operation.

More specifically, it is an object of my invention to provide an anti-pump circuit breaker control system for effecting transfer of a bus from one power source to another.

It is also an important object of my invention to provide a control system for locking out a circuit breaker against reclosure after the occurrence of a fault condition.

Another object of my invention is to provide a load bus transfer system wherein the bus is normally connected to a main source and is automatically connected to an alternate source as soon as the voltage of the main source falls below a predetermined value.

Yet another object of my invention is to provide for preventing reclosure of one of a pair of bus transfer circuit breakers supplying electrical energy to a load circuit when a fault condition, which causes the opening of the circuit breaker, results in an appreciable reduction in the circuit voltage.

Still another object of my invention is to provide for reenergizing the cut-off relay of a circuit breaker which is opened by a fault condition that results in the circuit voltage being appreciably reduced, in order to prevent reclosure of the circuit breaker by its closing relay upon the return of the voltage to normal.

Yet another object of my invention is to provide an automatic bus transfer system having overload protection for the alternate power source circuit breaker.

It is also an object of my invention to provide for automatically disconnecting a bus from a main or normal power source and connecting it to an emergency or alternate power source upon the occurrence of a fault, and for tripping and locking out the emergency circuit breaker, should the fault still be present.

Other objects will, in part, be obvious and will, in part, be explained hereinafter.

In practicing my invention in one form thereof, the load is normally connected to a load bus which is energized from a main power source through a main circuit breaker. Overload protection is provided by a feeder circuit breaker at the source. An auxiliary or alternate circuit breaker having overcurrent trip is provided so that the load bus may be connected to an alternate or emergency power source as soon as the voltage of the main power source fails for any reason, provided the voltage of the alternate power source is normal. Induction type voltage relays, having a delayed closing time, are used to open the main circuit breaker and effect the desired transfer operation. The voltage relay associated with the auxiliary circuit breaker provides an energizing circuit for the circuit breaker cut-off relay whenever voltage is restored after the occurrence of a fault which appreciably reduces the circuit voltage and causes the auxiliary circuit breaker to open, so as to prevent reclosure of the auxiliary circuit breaker. The voltage relay of the main circuit breaker effects tripping of the auxiliary circuit breaker whenever the voltage of the main power source is restored, thus making this source the preferred one.

For a further understanding of the nature and scope of my invention, reference may be made to the following detailed description which may be studied in connection with the accompanying drawing, in which the single figure is a diagrammatic view of a bus transfer system embodying the invention in one of its forms.

Referring to the single figure of the drawing, the reference numeral 10 may denote generally a bus transfer system wherein a load 11 connected to a load bus 12 is normally disposed to be connected by means of a main circuit breaker 14 to a main or preferred power source 15, as shown, and which may comprise a main feeder bus having suitable overload protection of any well known type. An auxiliary circuit breaker 17 may be provided for connecting the load bus 12 to an alternate or emergency power source 19, as shown, and which may comprise, for example, a Diesel engine driven generator. For the purpose of simplification, the system is shown in its normal operating condition with the main circuit breaker 14 closed and the load 11 connected to receive power from the normal power source 15. The emergency power source 19 is shown as having substantially normal voltage.

The main circuit breaker 14 may be of any suitable type having main contact members 14a, 14b, 14c for connecting the conductors of the load bus 12 to the normal power source. This circuit breaker may be provided with a closing solenoid 20 for operating an armature 21 connected to the operating lever 22 by a closing latch mechanism 23. It also may be provided with a mechanical trip mechanism comprising a plunger 25 for rotating the operating lever 22 about a pivot point in a counterclockwise direction to release the holding latch 27. The breaker may be tripped electrically by trip means 28 comprising an operating winding 29 for actuating an armature 30 to pivot the operating lever 22 in a counter-clockwise direction for likewise releasing the latch 27.

Control of the main breaker 14 may be effected in the usual manner by means of a closing relay 32 provided with an operating winding 33 for operating the relay to connect the solenoid winding 20 to the source. A cut-off relay 35 having an operating winding 36, disposed to be energized when the breaker closes, provides for deenergizing the closing relay 32.

The auxiliary or circuit breaker 17, which is shown in the open position, may be provided with main contact members 17a, 17b, 17c for connecting the load bus 12 to the emergency or alternate power source 19. This circuit breaker may have an operating winding 40 for actuating an armature 41 connected to an operating lever 42 by a closing latch mechanism 43. The breaker may be tripped mechanically by means of a plunger 45 disposed to actuate the operating lever 42 in a clockwise direction about a pivot to release a holding latch 47. Electrical tripping may be effected by trip means 48 comprising a trip winding 49 for actuating an armature 50 to pivot the operating lever 42 for releasing the latch 47.

In order to protect the alternate source 19 against overload conditions, the breaker 17 may be provided with overcurrent trip means 51 comprising operating windings 51a, 51b and 51c disposed to be connected in series circuit relation with the conductors from the alternate source 19 for actuating the operating lever 42 to trip the breaker.

Control of the auxiliary breaker 17 may be effected in the usual manner by means of a closing relay 52 having an operating winding 53 for operating the relay to connect the operating winding 40 of the breaker 17 to the alternate source. A cut-off relay 55 having an operating winding 56 may be provided for deenergizing the operating winding 53 of the closing relay 52 when the breaker 17 closes.

In order to make the main source 15 the preferred source and to provide for transferring from one source to the other only when the voltage of the source to which the transfer is to be made is substantially normal, means, such as the voltage relays 60 and 61, may be provided in connection with the normal and alternate sources 15 and 19, respectively. The voltage relays 60 and 61 may be of the induction type having rotating discs 62 and 63, respectively, for operating contacts 60a and 60b in accordance with the voltages of their respective sources. These relays because of their operating characteristics provide an inherent time delay and prevent tripping on momentary voltage dips, since a predetermined time interval is required for operation of their contacts after the relays are energized or deenergized.

Auxiliary relays 65 and 66 having operating windings 67 and 68, respectively, may be provided for operation under the control of their respective voltage relays 60 and 61. These auxiliary relays may be disposed to remain in the energized position until the voltages of their respective sources drop below a predetermined value, for example, about 50%.

By using the auxiliary relay 65 to complete a tripping circuit for the trip means 48 of the auxiliary breaker 17, this breaker may be opened to provide for transfer of the load bus 12 to the normal power source 15 a predetermined time after the voltage of this source returns to substantially normal value. By using back contact members of the auxiliary relay 65 and front contact members of the auxiliary relay 66 for energizing the trip means 28 of the main breaker, the tripping of this breaker is effected only when the voltage of the main or normal power source is reduced below the predetermined value, and the voltage of the alternate power source is of substantially normal value.

Whenever the auxiliary breaker 17 is tripped by its overcurrent trip means 51 without the voltage of the alternate power source dropping below the predetermined value, reclosure of the breaker 17 is prevented by reason of the cut-off relay 55 remaining energized, so as to prevent operation of the closing relay 52.

In order to prevent reclosure of the auxiliary breaker 17 whenever it is opened in response to a fault condition which reduces the voltage of the alternate power source to such a value that the cut-off relay 55 is deenergized, means may be provided for insuring reenergization of the cut-off relay 55 immediately upon the return of the voltage of the alternate power source to normal value. For example, the energizing circuit for the operating winding 56 of the cut-off relay 55 may be completed through normally closed contact members 66d of the auxiliary relay 66. Since the auxiliary relay 66 will likewise be deenergized when the voltage of the alternate power source 19 drops below the predetermined value, and it cannot be reenergized for a predetermined time until a voltage relay 61 again operates, a positive energizing circuit is provided for the cut-off relay 55, so as to effect deenergization of the closing relay 52 as soon as the voltage of the alternate power source is restored. Reclosure of the auxiliary breaker 17 is thus prevented. After the breaker 17 has been locked out due to a fault condition which reduces the voltage of the alternate power source 19 below the predetermined value, the circuit control may be reset by operating a push button switch 70 which disconnects the cut-off relay 55 from a source and restores it to the deenergized position.

With the transfer system in the normal operating condition, as shown, the main circuit breaker 14 is closed connecting the load 11 and the load bus 12 to the normal power source 15 through contacts 14a, 14b and 14c. Should a fault or other condition occur which opens the feeder circuit breaker at the source or otherwise reduces the voltage of the normal power source 15 below the predetermined value, the auxiliary relay 65 and the cut-off relay 35 return to their deenergized positions. If the voltage of the alternate power source 19 is substantially normal, the auxiliary relay 66 will have been operated to the energized position by its voltage relay 61 wherein it is retained by an energizing circuit through contact members 66b. The voltage relay 61 is deenergized by the opening of contact members 66a. Since the main breaker 14 is in the closed position, an energizing circuit is established for the trip winding 29 of the main breaker 14, extending from the alternate power source 19 through conductor 72, the reset push button switch 70, conductor 73, contact members 66c of the auxiliary relay 66, contact members 65c of the auxiliary relay 65, conductor 75, contact members 14d of the breaker 14, operating winding 29 and conductor 76 back to the alternate power source 19 through conductor 77. The main breaker 14 is accordingly opened.

As soon as the main breaker 14 opens, an energizing circuit is established for the closing relay 52 of the auxiliary circuit breaker 17 extending from the alternate power source 19 through conductor 72, reset push button switch 70, conductor 78, conductor 79, back contact members 55b of the cutoff relay 55, operating winding 53, conductor 80, back contact members 14e of the breaker 14, conductor 76 and conductor 77 back to the alternate power source 19. The closing relay 52 operates to connect the operating winding 40 of the auxiliary breaker 17 to the alternate power source 19 through contact members 52a. As soon as momentary contact members 17f of the breaker 17 close, the operating winding 56 of the cut-off relay 55 is energized, since contact members 14e of the main breaker 14 are now closed, and the cut-off relay operates to deenergize the operating winding 53 of the closing relay 52. A holding circuit is provided for the operating winding 56 of the cut-off relay 55 through contact members 55a.

Should the voltage of the normal power source 15 be restored, the voltage relay 60 operates after a predetermined time delay to close its contact members 60a. The operating winding 67 of the auxiliary relay 65 is thus energized, and the auxiliary relay 65 returns to the energized position, deenergizing the voltage relay 60 by opening contact members 65a and locking itself in through contact members 65b. At the same time an energizing circuit is established for the trip means 48 of the auxiliary breaker 17 extending from the normal power source 15 through conductor 82, conductor 83, operating winding 49, contact members 17d, contact members 65d to the normal power source through conductor 84. The auxiliary breaker 17 opens. An energizing circuit is thereby provided for the operating winding 33 of the closing relay 32, extending from the normal source 15 through conductor 82, conductor 83, contact members 17e, operating winding 33, contact members 35b to the normal power source through conductor 84. The closing relay 32 operates to connect the operating winding 20 of a main breaker 14 to the normal power source through contact members 32a to effect closure of the main breaker 14. Upon closure of the main breaker 14, the operating winding 36 of the cut-off relay 35 is energized through contact members 14f. The cut-off relay thereby operates to deenergize the operating winding 33 by opening its contact members 35b. A holding circuit is provided through contact members 35a.

Should the auxiliary breaker 17 be tripped by the overcurrent trip means 51 while it is in the closed position and the main breaker 14 remains open, reclosure of the auxiliary breaker 17 is prevented if the voltage of the alternate source 19 does not drop below the predetermined value, since the cut-off relay 55 remains in the energized position, thus interrupting the energizing circuit for the operating winding 53 of the closing relay 52 at its contact members 55b. Should the auxiliary breaker 17 be tripped by the overcurrent trip means 51 under fault conditions which reduce the voltage of the alternate source 19 below the predetermined value, both the cut-off relay 55 and the auxiliary relay 66 will be deenergized. Upon restoration of the voltage of the alternate source 19, which will normally occur when the auxiliary breaker 17 disconnects the alternate power source from the load bus, the closing relay 52 will tend to operate since a circuit is established therefor through contact members 55b of the cut-off relay 55. However, at the same time, an energizing circuit is established for the operating winding 56 of the cut-off relay 55 through back contact members 66d of the auxiliary relay 66. This relay was also deenergized upon failure of the voltage of the alternate source 19, and cannot be reenergized for a predetermined time after the restoration of voltage, since the voltage relay 61 is of the induction type and requires a predetermined time after the application of voltage before closing its contact members 60b. Accordingly, the cut-off relay 55 operates at about the same time or before the closing relay 52 and interrupts the energizing circuit for the operating winding 53 of the closing relay 52 at contact members 55b. Therefore, the auxiliary breaker 17 cannot reclose, and the cut-off relay 55 remains in the energized position locking the breaker 17 out.

Restoration of the system may be effected by opening the reset push button switch 70 to deenergize the operating winding 56 of the cut-off relay 55. If the voltage of the alternate source 19 has been restored for the predetermined time interval, the voltage relay 61 will have operated to establish an energizing circuit for the operating winding 68 of the auxiliary relay 66. Accordingly, as soon as the cut-off relay 55 returns to its deenergized position, an energizing circuit is established for the operating winding 53 of the closing relay 52, and the auxiliary breaker 17 may be reclosed.

From the above description and the accompanying drawing, it will be apparent that I have provided in a simple and effective manner for preventing pumping of a circuit breaker in a bus transfer system which is provided with overcurrent trip protection. Transfer of the load bus from the main power source to the alternate power source and vice versa is entirely automatic, and lock-out is effected upon the occurrence of fault conditions under which it is undesirable to attempt to effect reclosure of the circuit breakers. The system of my invention is simple and effective and requires a minimum amount of apparatus.

Since certain changes may be made in the above described contruction, and different embodiments of the invention may be made without departing from the spirit or scope thereof, it is intended that all the matter contained in the above description and shown in the accompanying drawing shall be considered as illustrative and not in a limiting sense.

I claim as my invention:

1. A control system for a circuit breaker connecting a load to a source of electrical energy comprising a closing relay for operating the circuit breaker, a cut-off relay operable to render the closing relay inoperative, control means responsive to the voltage of the source for tripping the circuit breaker when the voltage of the source drops to a predetermined value, additional control means responsive to predetermined current conditions for tripping the circuit breaker, and circuit means including means responsive to a predetermined reduction in the voltage of the source to provide for energization of the cut-off relay as soon as the voltage of the source is restored for preventing operation of the closing means to reclose the auxiliary circuit breaker after it opens.

2. A transfer system for a bus having a pair of circuit breakers for energizing the bus from main and alternate power sources comprising, control means including a closing relay and a cut-off relay operable to energize the closing relay for closing the main circuit breaker when the voltage of the main source is above a predetermined value and the auxiliary circuit breaker is open, closing means including a closing relay and a cut-off relay operable to deenergize the closing relay responsive to the voltage of the alternate source when the main circuit breaker is open for closing the auxiliary circuit breaker, control means responsive to voltage conditions of the main source for tripping the main circuit breaker when the voltage of the main source drops below a predetermined value and tripping the auxiliary circuit breaker when the voltage of the main source is restored, whereby the main circuit breaker closing means recloses the main circuit breaker, and circuit means associated with each of the circuit breakers connected to provide an operating circuit for its associated cut-off relay as soon as voltage is restored to its associated source for preventing any reclosure of its associated circuit breaker.

3. The combination in a transfer system for a bus having a main circuit breaker for connecting it to a main source and an auxiliary circuit breaker for connecting it to an alternate source, of circuit means including closing means for normally effecting closure of each of the circuit breakers in response to predetermined voltage conditions of its associated source when the other circuit breaker opens, cut-off means openable to effect deenergization of the closing means, control means for each of the circuit breakers for effecting opening of said circuit breakers, relay means for tripping the auxiliary circuit breaker in response to a fault condition and circuit means responsive to a reduction of the voltage of the alternate source providing an operating circuit for the cut-off means for preventing operation of the closing means to reclose the auxiliary circuit breaker when the voltage of the alternate source is restored.

4. A transfer system for a load bus having main and auxiliary power sources of electrical energy comprising, a main circuit breaker for normally connecting the load bus to the main source, an auxiliary circuit breaker for connecting the load bus to the auxiliary source, closing means responsive to voltage conditions of the sources for providing an operating circuit for the auxiliary circuit breaker when the main circuit breaker is open, a cut-off relay responsive to a predetermined voltage of the auxiliary source for deenergizing the closing means when the auxiliary circuit breaker closes, means for opening the main circuit breaker when the voltage of the main source reaches a predetermined minimum value and tripping the auxiliary circuit breaker when it reaches a predetermined normal value, and control means responsive to a reduction in voltage of the auxiliary source for preventing reclosure of the auxiliary circuit breaker by providing an operating circuit for the cut-off relay before the auxiliary circuit breaker closes.

5. For use with a load circuit having main and auxiliary power sources, a main circuit breaker for normally connecting the load circuit to the main source, an auxiliary circuit breaker provided with overcurrent trip means for connecting the load circuit to the auxiliary source, control means responsive to the voltages of each of the sources for normally effecting closure of their respective circuit breakers when the other circuit breaker is open, circuit means including relay means responsive to the voltage of the main source and relay means responsive to the voltage of the auxiliary source for tripping the auxiliary circuit breaker when the voltage of the main source is substantially normal and for tripping the main circuit breaker whenever the voltage of the main source drops to a predetermined value below normal, provided the voltage of the auxiliary source is substantially normal, and circuit means including contact means responsive to a reduction in the voltage of the auxiliary source when the load circuit is connected thereto for locking out the closing means as soon as the auxiliary circuit breaker opens to prevent reclosure of the auxiliary circuit breaker.

6. A transfer system for a pair of circuit breakers for connecting a load bus to main or alternate power sources comprising, closing means for each of the circuit breakers, circuit means for operating the closing means of each circuit breaker when the other circuit breaker is open, additional circuit means connected for tripping one of the circuit breakers only when the voltage of the other source is normal, means responsive to predetermined current conditions for tripping the one circuit breaker, and means responsive to a predetermined reduction in the voltage of the source associated with said one circuit breaker effective to prevent reclosure of said circuit breaker when the voltage thereof is restored.

7. A transfer system for energizing a load bus from one or the other of a main power source and an emergency power source comprising, a main circuit breaker for normally connecting the bus to the main source, an auxiliary circuit breaker for connecting the bus to the emergency source when the main circuit breaker is open, means including a closing relay for closing each of the circuit breakers when the other circuit breaker is open, a cut-off relay for each circuit breaker disposed to be energized when the said circuit breaker closes to deenergize the closing relay, said cut-off relay being provided with a holding circuit so long as the voltage of its associated source remains substantially normal, shunt trip means for each of the circuit breakers, means responsive to the voltage of the main source for energizing the shunt trip means of the auxiliary circuit breaker when it is closed if the voltage of the main source is substantially normal and prepare for energizing the shunt trip means of the main circuit breaker when the voltage of the main source drops below a predetermined value for a predetermined time, and means responsive to the voltage of the alternate source for cooperating with the means of the main source to provide for energizing the shunt means of the main circuit breaker when the voltage of the alternate source is substantially normal and to provide an energizing circuit for the cut-off relay of the auxiliary circuit breaker when voltage is restored after a fault condition which reduces the voltage of the auxiliary source to prevent reclosure of said circuit breaker.

WILLIAM R. TALIAFERRO.

REFERENCES CITED

The following references are of record in the file of this patent:

UNITED STATES PATENTS

| Number | Name | Date |
|---|---|---|
| 2,018,495 | Hoffmann | Oct. 22, 1935 |
| 2,172,950 | Anderson | Sept. 12, 1939 |